US007633558B2

(12) United States Patent
Tsai et al.

(10) Patent No.: US 7,633,558 B2
(45) Date of Patent: Dec. 15, 2009

(54) DISPLAY DEVICE CAPABLE OF COMPENSATING FOR LUMINANCE OF ENVIRONMENTS

(75) Inventors: Chin-Peng Tsai, Taipei (TW); Wen-Wei Tsai, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 796 days.

(21) Appl. No.: 11/278,954

(22) Filed: Apr. 6, 2006

(65) Prior Publication Data

US 2007/0171217 A1 Jul. 26, 2007

(30) Foreign Application Priority Data

Jan. 20, 2006 (TW) .............................. 95102372 A

(51) Int. Cl.
*H04N 5/57* (2006.01)
*H04N 5/52* (2006.01)
*H04N 5/202* (2006.01)

(52) U.S. Cl. ....................... 348/687; 348/602; 348/674; 348/678

(58) Field of Classification Search ................. 348/602, 348/603, 658, 687, 674, 675, 678, 679; 345/102, 345/77, 78, 207, 87; *H04N 5/57, 9/73, 5/202, H04N 9/69, 5/52*
See application file for complete search history.

(56) References Cited

U.S. PATENT DOCUMENTS

| | | | | |
|---|---|---|---|---|
| 5,270,818 | A * | 12/1993 | Ottenstein | 348/602 |
| 7,515,160 | B2 * | 4/2009 | Kerofsky | 348/602 |
| 2004/0036703 | A1 | 2/2004 | Aoki et al. | |
| 2005/0068332 | A1 | 3/2005 | Diefenbaugh et al. | |

FOREIGN PATENT DOCUMENTS

| | | |
|---|---|---|
| CN | 1607884 A | 4/2005 |
| JP | 06-083287 | 3/1994 |
| JP | 2001-051652 | 2/2001 |
| WO | WO-2005/086474 A1 | 9/2005 |

* cited by examiner

*Primary Examiner*—Sherrie Hsia
(74) *Attorney, Agent, or Firm*—Winston Hsu

(57) ABSTRACT

A display device capable of compensating for luminance of an environment is disclosed. The display device includes: a sensor, for sensing the luminance of the environment to generate a sensing signal corresponding to the luminance; a scaler, coupled to the sensor, for processing an original image signal according to the sensing signal to generate an adjusted image signal; and an image outputting device for outputting an image according to the adjusted image signal; wherein the scaler includes: an image signal adjuster for adjusting the original image signal to compensate for the luminance and generate a compensated image signal; and a gain controller coupled to the image signal adjuster for adjusting a gain setting and utilizing the adjusted gain setting to process the compensated image signal in order to generate the adjusted image signal.

20 Claims, 7 Drawing Sheets

DISPLAY DEVICE CAPABLE OF COMPENSATING FOR LUMINANCE OF ENVIRONMENTS

BACKGROUND OF THE INVENTION

1. Field of the Invention

The invention relates to a display, and more particularly, to a display capable of compensating for luminance of an environment.

2. Description of the Prior Art

Almost all electronic devices need to transfer information through a display device. A computer system, for example, needs a display to show the execution condition of application software to users. A cell phone also needs a display to show communication data to users. These products are commonly found in consumers' homes because of the rapid progress of communications technology. Moreover, said display devices have progressed from old-fashioned cathode ray tube (CRT) displays to LCDs and plasma displays.

Please refer to FIG. 1 , which is a diagram of a $\gamma$=2.2 characteristic curve of a CRT display and a $\gamma$=1/2.2 characteristic curve of a video recording device according to the prior art. As is well known in the art, the relationship between red-green-blue (RGB) gain values and outputting luminance for human vision complies with the $\gamma$=2.2 characteristic curve shown in FIG. 1, due to characteristics of CRT displays (such as the response time of the cathode ray tube). In addition, in the past, all displays were CRT displays. Therefore, corresponding video recording devices should have an inverse $\gamma$=1/2.2 characteristic curve. For the user, the visual effect can be a linear $\gamma$=1 curve (as the dotted line shown in FIG. 1). This makes the image shown on the display resemble the real world.

Although LCDs and plasma displays are available on the market, video recording devices still have the $\gamma$=1/2.2 characteristic curve. Therefore, said LCD and plasma displays have to comply with the $\gamma$=2.2 characteristic curve to give users a 'real world' effect.

In general, a normal LCD includes an ambient sensor to control the luminance of the backlight module to make the luminance correspond to the luminance of the environment. In other words, if the luminance of the environment becomes lighter or darker, the image shown on the display will also be adjusted. This is so users will not feel the effect of an environment change.

Unfortunately, the above-mentioned adjustment method suffers from two problems. Please refer to FIG. 2, which is a diagram of characteristic curves of an LCD. If the luminance of the backlight module is directly adjusted, the RGB gain values cannot be adjusted perfectly according to the $\gamma$=2.2 characteristic curve. In other words, when the luminance of the backlight module changes, because the RGB gain values change, the proportions of the RGB colors of the processed image signal will also change in accordance with the variances of the RGB gain values. This introduces distortions to the image. As shown in FIG. 2, if the luminance of the backlight module is adjusted to be stronger, the characteristic curve may be shifted from the original $\gamma$=2.2 curve to a curve having a lower curvature (for example, $\gamma$=1.2). On the other hand, if the luminance of the backlight module is adjusted to be darker, the characteristic curve may be shifted from the original $\gamma$=2.2 curve to a curve having a higher curvature (for example, $\gamma$=3.2). These shifts result in a displayed image that is significantly different from the original $\gamma$=2.2 curve, and will therefore have unclear details; the exposure of the entire image will be too great (meaning that the image is too light), or the exposure will not be sufficient (meaning that the image is too dark.)

SUMMARY OF THE INVENTION

It is therefore one of the primary objectives of the claimed invention to provide a display not only capable of adjusting display luminance according to the luminance of the environment, but also capable of outputting a clear image, to solve the above-mentioned problem.

According to an exemplary embodiment of the claimed invention, a display device capable of compensating for luminance of an environment is disclosed. The display includes: a sensor, for detecting luminance of an environment to generate a sensing signal; a scaler, electrically connected to the sensor, for generating an adjusted image signal according to the sensing signal, the scaler comprising: an image signal adjuster, for compensating for the luminance of an environment according to the sensing signal and generating a compensated image signal; and a gain controller, electrically connected to the image signal adjuster, for adjusting a gain setting according to the sensing signal and utilizing the gain setting to amplify the compensated image signal to generate the adjusted image signal; and an image outputting device, electrically connected to the scaler, for outputting an image according to the adjusted image signal.

According to another exemplary embodiment of the claimed invention, a display device capable of compensating for luminance of an environment is disclosed. The display includes: a display light source; a sensor, for sensing a luminance of an environment to generate a sensing signal corresponding to the luminance; a scaler, electrically connected to the sensor and the display light source, for processing an original image signal according to the sensing signal to generate an adjusted image signal, the scaler comprising: a light source adjuster, for adjusting the display light source according to the sensing signal to compensate for the luminance; a gain controller, for adjusting a gain setting according to the sensing signal and utilizing the gain setting to amplify the original image signal to generate the adjusted image signal; and an image outputting device, electrically connected to the scaler, for outputting an image according to the adjusted image signal.

The present invention display can react to the luminance of the environment and have the $\gamma$=2.2 image outputting effect. Therefore, the present invention display does not influence the characteristic curve even if the luminance of the image changes. In other words, even if the luminance of the display screen becomes lighter or darker, the details of the image will still have no distortions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
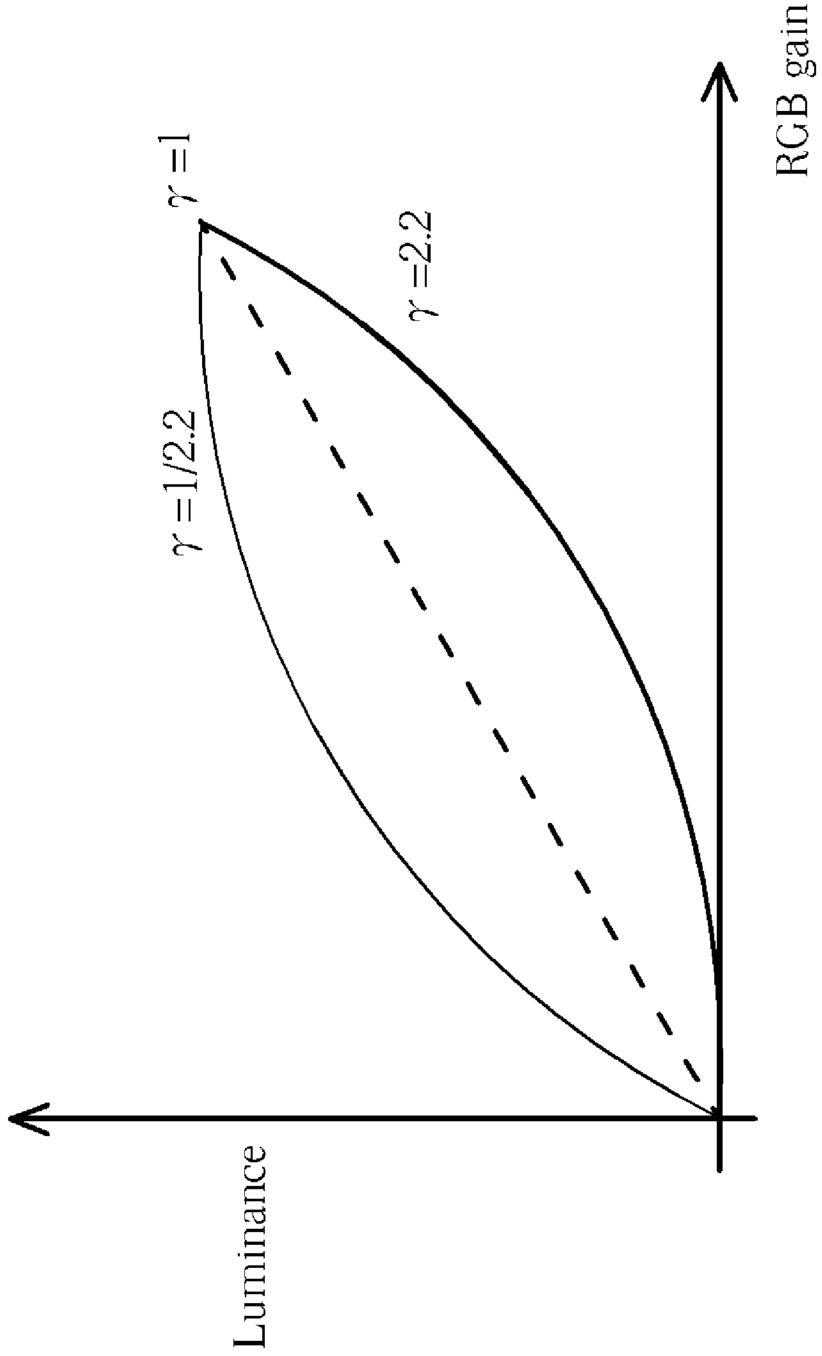
Fig. 1 Prior Art
FIG. 1 is a diagram of a $\gamma$=2.2 characteristic curve of a CRT display and a $\gamma$=1/2.2 characteristic curve of a video recording device according to the prior art.
Figure 2:
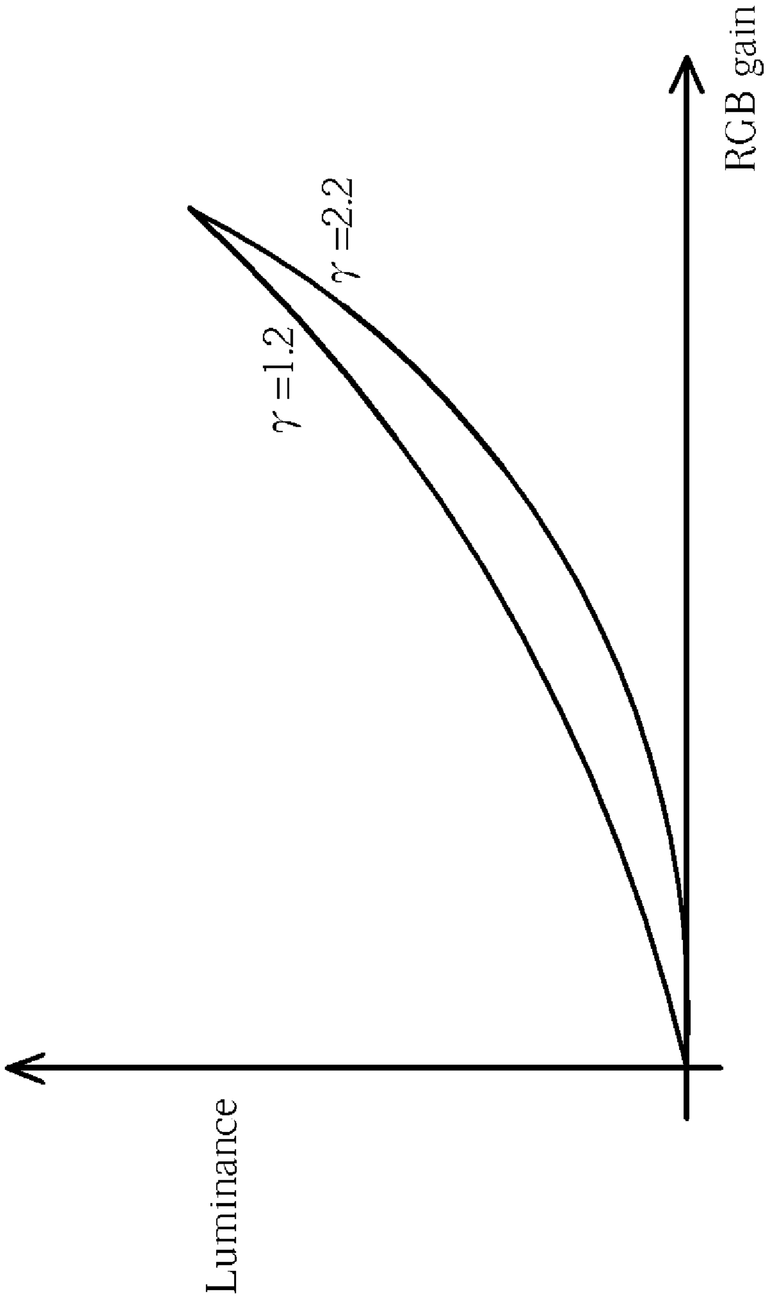
Fig. 2 Prior Art
FIG. 2 is a diagram of characteristic curves of a LCD.
Figure 3:
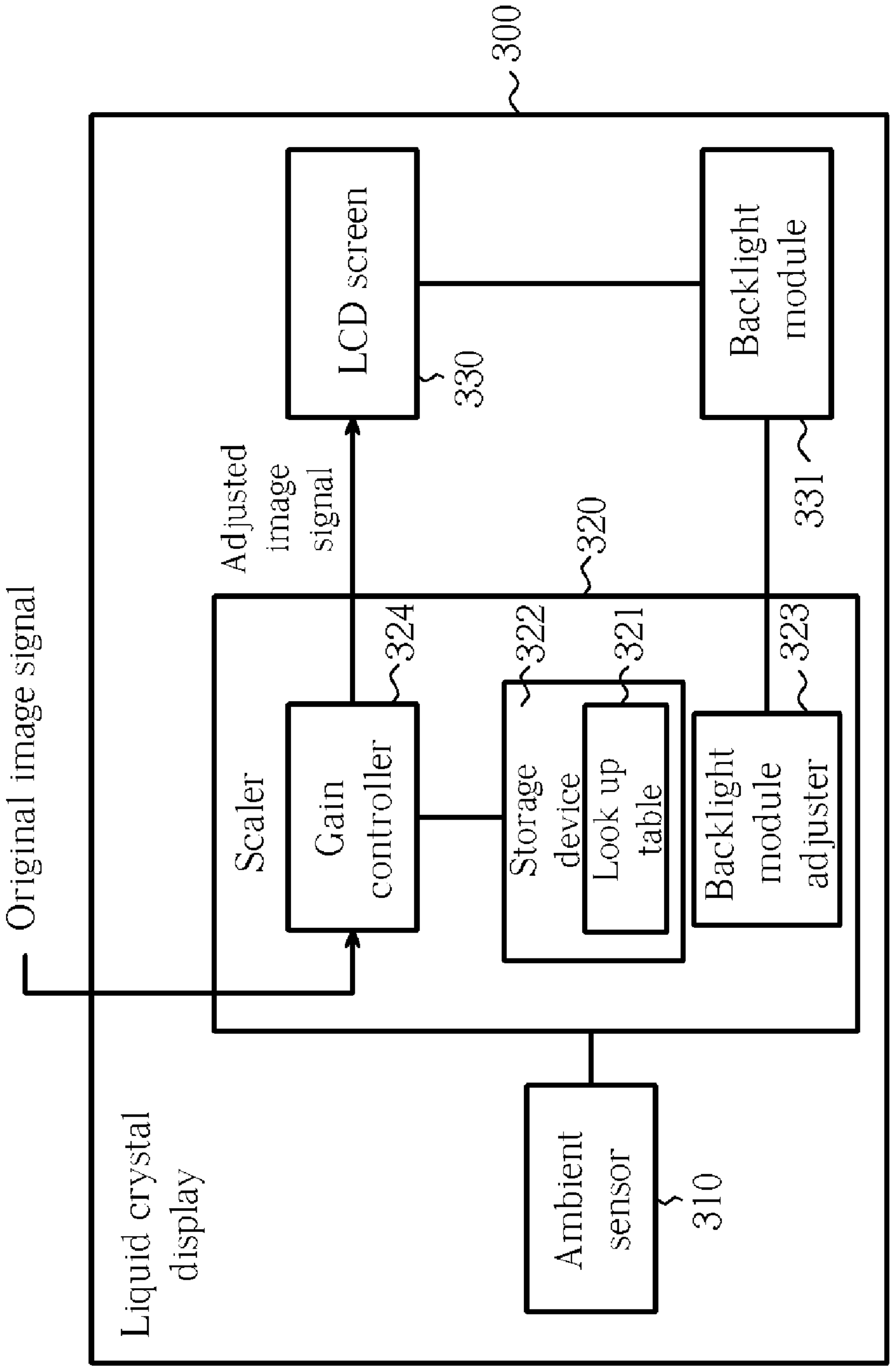
FIG. 3 is a functional block diagram of an LCD of an embodiment according to the present invention.

Please refer to FIG. 3, which is a functional block diagram of an LCD 300 of an embodiment according to the present invention. As shown in FIG. 3, the LCD 300 includes an ambient sensor 310, a scaler 320, a liquid crystal display screen (LCD screen) 330, and a backlight module 331. The scaler 320 includes a backlight module adjuster 323, a gain controller 324, and a storage device 322 for storing a look-up table 321. The connection of each device is shown in FIG. 3. The scaler 320 is connected to the ambient sensor 310, the backlight module adjuster 323 is connected to the backlight module 331, and the gain controller 324 is connected to the LCD screen 330 and the storage device 322. The backlight module adjuster 323 is utilized to adjust the backlight module (known as a light source) to compensate for the environment luminance according to a sensing signal generated from the ambient sensor. Therefore, the backlight module adjuster 323 can also be called a light source adjuster. The operation and function of the LCD 300 will be illustrated in the following disclosure, and is thus omitted here.

Figure 4:
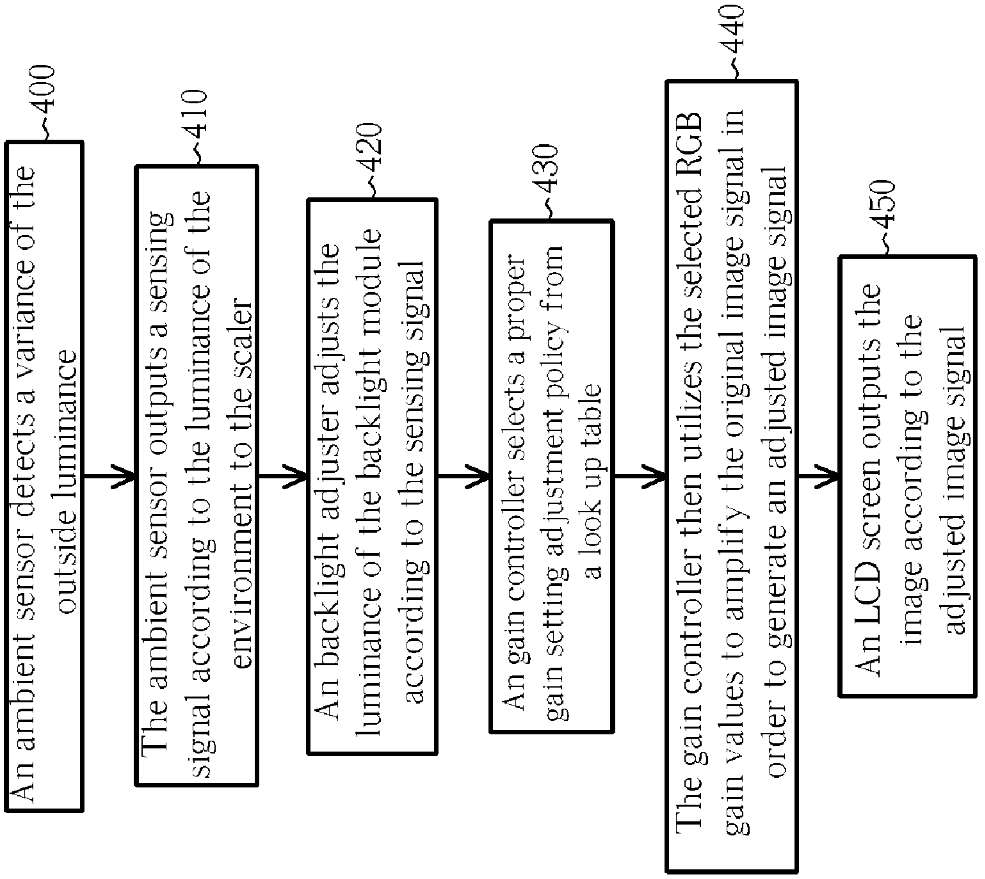
FIG. 4 is a flow chart of an operation of the LCD shown in FIG. 3 according to the present invention.

Please refer to FIG. 4, which is a flow chart of an operation of the LCD 300 shown in FIG. 3. The flow chart includes the following steps. First, the ambient sensor 310 detects a variance of the outside luminance (step 400) and outputs a sensing signal according to the luminance of the environment to the scaler 320 (step 410). The backlight adjuster 323 of the scaler 320 adjusts the luminance of the backlight module 331 according to the sensing signal (step 420). As mentioned previously, the color mixed ratio of the RGB is followed the changing of the luminance of the backlight module 331. Therefore, the changed color portions should be adjusted back to the original $\gamma$=2.2 color portions.

In this embodiment, the look-up table 321 stores a plurality of gain setting adjustment policies. The gain controller 324, which is inside the scaler 320, selects a proper gain setting adjustment policy according to the adjusted luminance of the backlight module 331 (or according to the sensing signal outputted by the ambient sensor 310) to adjust the RGB color portions of the image. For example, the look-up table 321 can store a plurality of data, where each data corresponds to a relationship between the adjusted luminance of the backlight module 331 and the RGB gain values. This means the gain controller 324 can select a corresponding set of RGB gain values from the look-up table 321 according to the adjusted backlight module 331. The gain controller 324 then utilizes the selected RGB gain values to amplify the original image signal in order to generate an adjusted image signal (step 440). The LCD screen 330 then outputs the image according to the adjusted image signal (step 450).

Please note that the composite effect of the selected RGB gain values and the adjusted luminance of the backlight module 331 comply with the display effect of an $\gamma$=2.2 characteristic curve; in other words, the display effect of the adjusted image signal and the adjusted luminance of the backlight module 331 can comply with the $\gamma$=2.2 characteristic curve. Therefore, the present invention not only can adjust the luminance of the LCD screen 330, but will also have a good image outputting effect. The display image therefore does not have distortions due to the variances of the luminance of the LCD screen 330.

Figure 5:
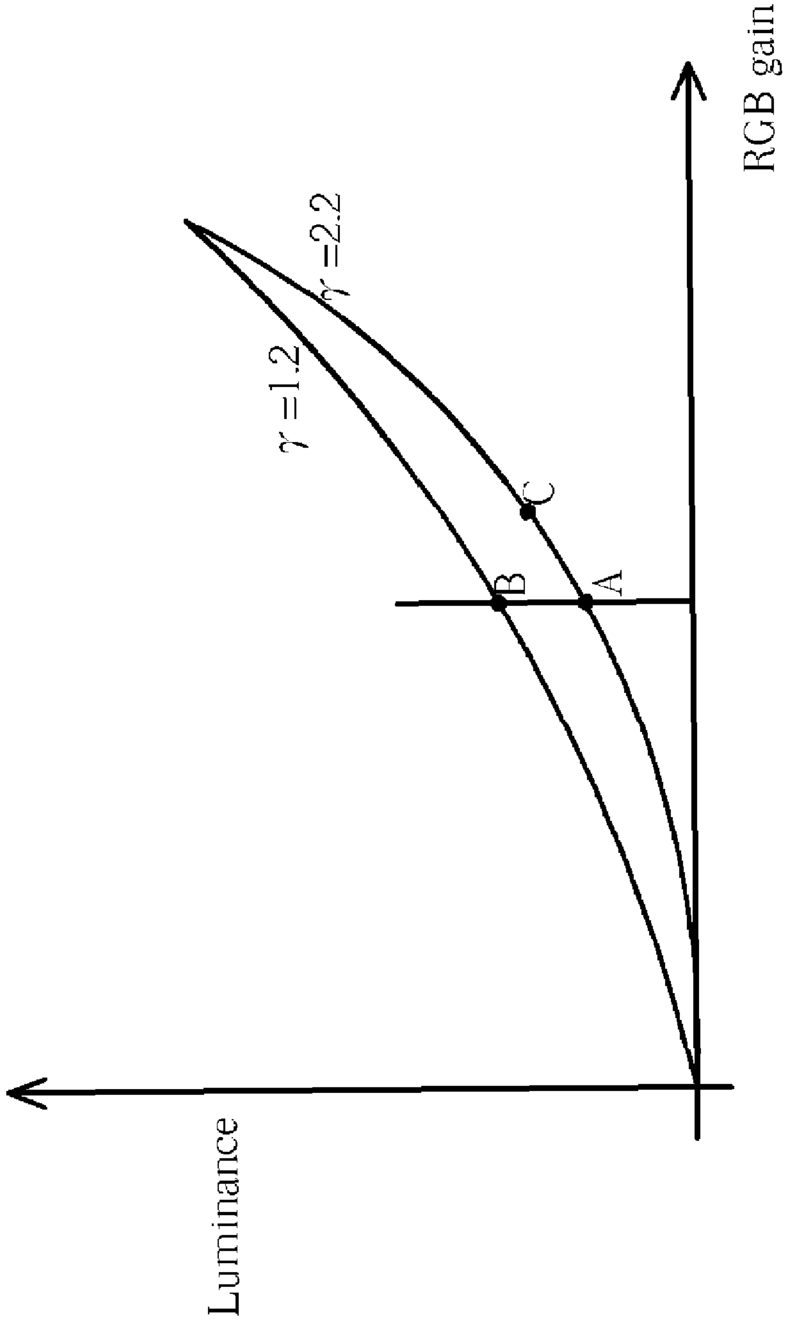
FIG. 5 illustrates the determination method of the RGB gain values inside the look-up table.

In addition, the establishment of the look-up table 321 can be easily accomplished by those skilled in the art. Before the LCD 300 is manufactured, various settings can be obtained through repeated experiments, and these settings can be stored inside the look-up table 321, therein to be used by the scaler 320. Please refer to FIG. 5, which illustrates the determination method of the RGB gain values inside the look-up table. As mentioned previously, the variance of the luminance of the backlight module 331 influences the characteristic curve of the entire LCD 300. Assume that if the backlight module 331 is adjusted to be lighter, the characteristic curve will be shifted from $\gamma$=2.2 to $\gamma$=1.2. Therefore, an image signal originally corresponding to point A will change to correspond to a new point B due to the variance of the characteristic curve. Because the RGB color portions corresponding to point B do not comply with the $\gamma$=2.2 characteristic, the present invention directly utilizes the characteristic of point C. As shown in FIG. 5, the luminance of point C is higher than that of point A, and point C furthermore lies in the $\gamma$=2.2 characteristic curve. Therefore, if the scaler 320 utilizes the RGB gain values corresponding to point C to process the original signal, the adjusted image signal not only can react to the luminance of the environment, but can also have the $\gamma$=2.2 image outputting effect.

In addition, in a preferred embodiment of the present invention, the designer can simply determine several levels of the backlight module luminance. For example, the outside luminance can be set as four levels in descending order of brightness, namely: light, dim light, dark, and very dark. The luminance of the backlight module 331 also needs to have four different adjustment levels, meaning the data stored in the look-up table will not be too large, and the storage device 322 does not need to have a big storage capacity. This can save on various costs of the LCD 300. Furthermore, the present invention does not limit the amount of data that can be stored in the look-up table 321, so, if cost is not an issue, the backlight module 331 can have more adjustment levels to make the LCD 300 capable of reacting more accurately.

Please note that, in the above-mentioned embodiment, the present invention reacts to outside luminance by adjusting the backlight module. However, the present invention can compensate the original image signal first, and then change the entire luminance of the LCD screen 330, wherein the compensated signal is adjusted according to data stored inside the look-up table 321. This also enables the LCD screen 330 to display an image having a good luminance and display effect.

Figure 6:
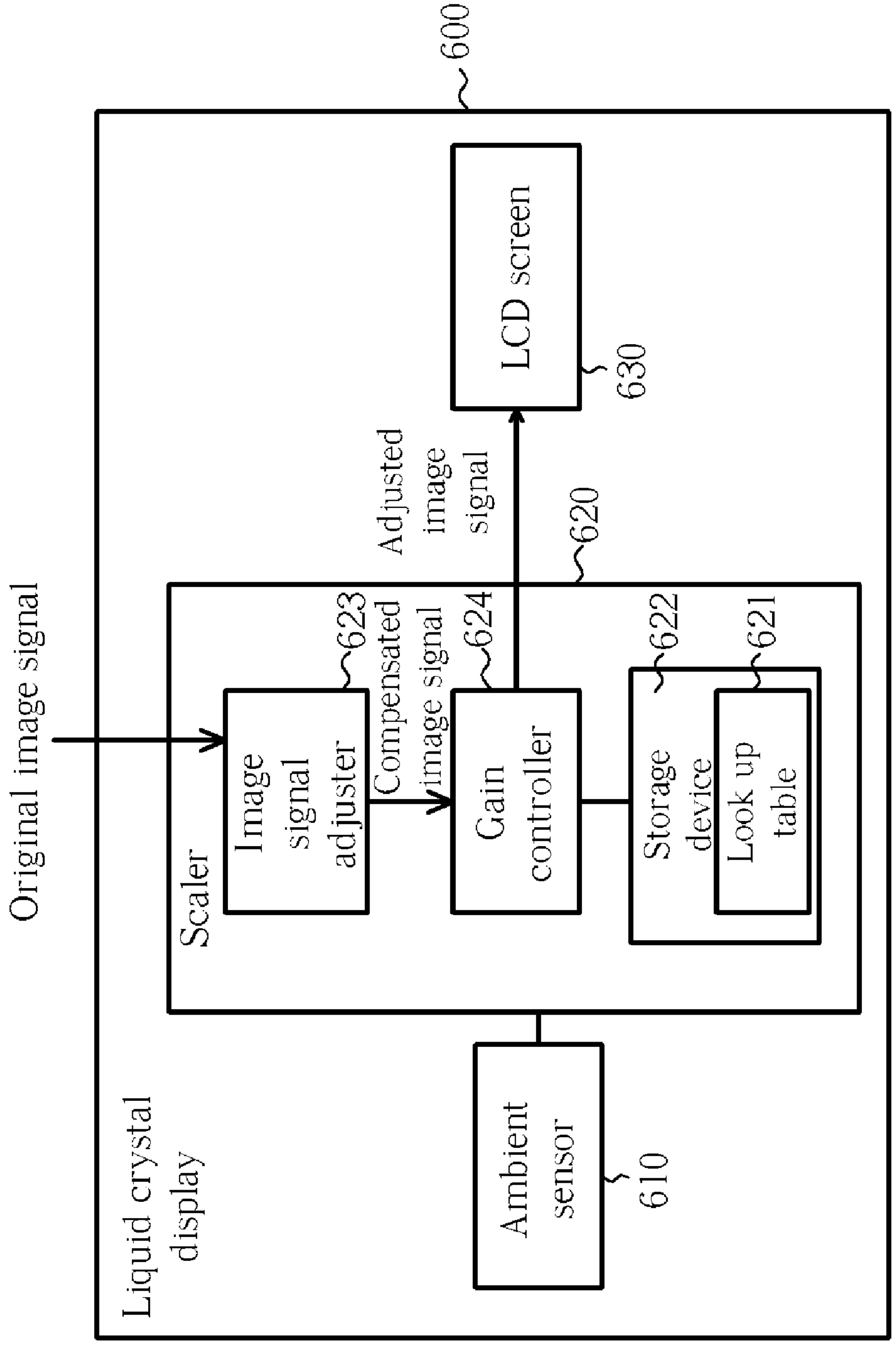
FIG. 6 is a functional block diagram of an LCD of an embodiment according to the present invention.

Please refer to FIG. 6, which is a functional block diagram of an LCD of an embodiment according to the present invention. As shown in FIG. 6, the LCD 600 includes an ambient sensor 610, a scaler 620, and an LCD screen 630. The scaler 620 includes an image signal adjuster 623, a gain controller 624, and a storage device 622 for storing a look-up table 621. The connection of each device is shown in FIG. 6. The scaler 620 is electrically connected to the ambient sensor 610. The gain controller 624 is electrically connected to the image signal adjuster 623 and the LCD screen 630. The operation and function of the LCD 600 will be illustrated in the following disclosure.

Figure 7:
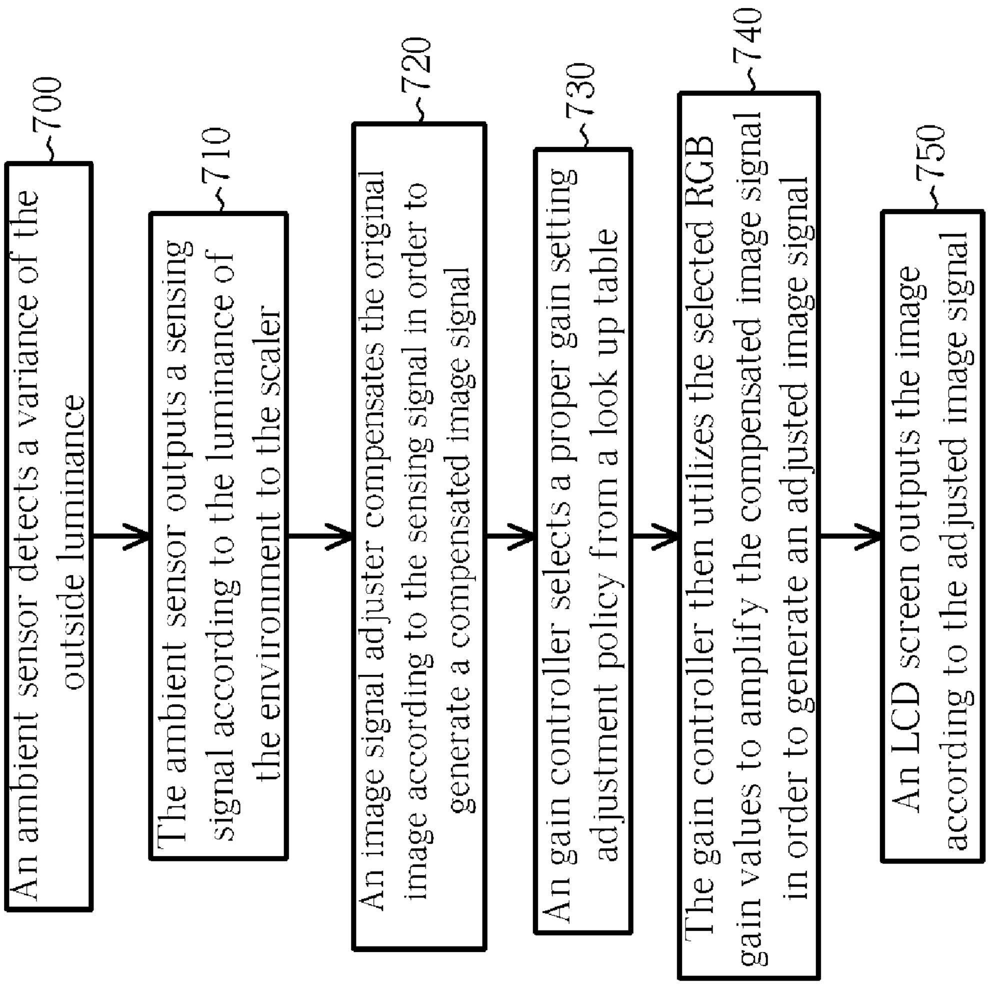
FIG. 7 is a flow chart of an operation of an LCD shown in FIG. 6.

Please refer to FIG. 7, which is a flow chart of an operation of an LCD 600 shown in FIG. 6. It includes the following steps. First, the ambient sensor 610 detects a variance of the outside luminance (step 700) and outputs a sensing signal according to the luminance of the environment to the scaler 620 (step 710). In this embodiment, the image signal adjuster 623 of the scaler 620 directly compensates the original image. For example, if the outside luminance is stronger, the image signal adjuster 623 can directly add a difference Δ to each of the RGB values of the original image signal (step 720) to obtain a compensated image signal (R+Δ△G+Δ△B+Δ). Obviously, the RGB color portions of the compensated image signal (R+Δ△G+Δ△B+Δ) are different from the original RGB color portions. The gain controller 624 selects a corresponding RGB gain value from the look-up table 621 (step 730) to amplify the compensated image signal (R+Δ△G+Δ△B+Δ) in order to generate an adjusted image signal (step 740). The LCD screen 630 then outputs an image according to the adjusted image signal (step 750).

Please note that, in this embodiment, the adjusted image signal complies with the $\gamma=2.2$ characteristic curve, and the corresponding luminance of the adjusted image signal is higher than that of the original image signal. Therefore, the display image of the LCD screen 630 not only can react to outside luminance, but can also have the $\gamma=2.2$ image outputting effect. Furthermore, please note the establishment of the look-up table 621 is similar to that of the look-up table 321, and is thus omitted here.

It should be noted that the present invention does not limit the implementations of the ambient sensors 310 and 610. For example, the ambient sensors 310 and 610 can be implemented by light-sensing ICs, light-sensing diodes, light-sensing resistors, or by other light-sensing devices. These modifications also obey the spirit of the present invention.

Furthermore, the above-mentioned LCD is only utilized as a preferred embodiment, and not a limitation of the present invention. In other words, the present invention can be utilized in all kinds of displays, such as a plasma display or a projector. This also obeys the spirit of the present invention.

In addition, the above-mentioned adjusted image signal, the original image signal, and compensated signal are all RGB signals. Similarly, the RGB signals are utilized as an embodiment, not a limitation, and other types of image signals can also be utilized. This also obeys the spirit of the present invention.

In contrast to the prior art, the present invention display can react to the luminance of an environment and still have the $\gamma=2.2$ image outputting effect. Therefore, the present invention display does not influence the characteristic curve even if the luminance of the image changes. Even if the luminance of the display screen becomes lighter or darker, the details of the image will still have no distortions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device capable of compensating for luminance of an environment, the display device comprising:
- a sensor, for detecting a luminance of an environment to generate a sensing signal;
- a scaler, electrically connected to the sensor, for generating an adjusted image signal according to the sensing signal, the scaler comprising:
  - an image signal adjuster, for compensating for the luminance of the environment according to the sensing signal, and generating a compensated image signal; and
  - a gain controller, electrically connected to the image signal adjuster, for adjusting a gain setting according to the sensing signal and utilizing the gain setting to amplify the compensated image signal to generate the adjusted image signal; and
- an image outputting device, electrically connected to the scaler, for outputting an image according to the adjusted image signal.

2. The display device capable of compensating for luminance of an environment of claim 1, wherein the image outputting device is a display.

3. The display device capable of compensating for luminance of an environment of claim 2, wherein the display screen is an LCD or a plasma display.

4. The display device capable of compensating for luminance of an environment of claim 1, wherein the display device is a projector.

5. The display device capable of compensating for luminance of an environment of claim 1, wherein the gain controller adjusts the gain setting further according to a specific $\gamma$ curve.

6. The display device capable of compensating for luminance of an environment of claim 5, wherein a curvature of the specific $\gamma$ curve is 2.2.

7. The display device capable of compensating for luminance of an environment of claim 1, wherein the scaler further comprises:
- a storage device, electrically connected to the scaler, for storing a look-up table, the look-up table storing a plurality of gain setting adjustment policies;
- wherein the gain controller selects a gain setting adjustment policy from the look-up table according to the sensing signal in order to adjust the gain setting.

8. The display device capable of compensating for luminance of an environment of claim 1, further comprising:
- a storage device, electrically connected to the scaler, for storing a look-up table, the look-up table storing a plurality of gain setting adjustment policies;
- wherein the gain controller selects a gain setting adjustment policy from the look-up table according to the sensing signal in order to adjust the gain setting.

9. The display device capable of compensating for luminance of an environment of claim 1, wherein the adjusted image signal and the compensated image signal are both composed of RGB signals.

10. The display device capable of compensating for luminance of an environment of claim 1, wherein the sensor is a light-sensing IC, a light-sensing diode, or a light-sensing resistor.

11. A display device capable of compensating for luminance of an environment, the display device comprising:
- a display light source;
- a sensor, for sensing a luminance of an environment to generate a sensing signal corresponding to the luminance; and
- a scaler, electrically connected to the sensor and the display light source, for processing an original image signal according to the sensing signal to generate an adjusted image signal, the scaler comprising:
  - a light source adjuster, for adjusting the display light source according to the sensing signal to compensate for the luminance;
  - a gain controller, for adjusting a gain setting according to the sensing signal and utilizing the gain setting to amplify the original image signal to generate the adjusted image signal; and
  - an image outputting device, electrically connected to the scaler, for outputting an image according to the adjusted image signal.

12. The display device capable of compensating for luminance of an environment of claim 11, wherein the image outputting device is a display.

13. The display device capable of compensating for luminance of an environment of claim 12, wherein the display is an LCD.

14. The display device capable of compensating for luminance of an environment of claim 11, wherein the display device is a projector.

15. The display device capable of compensating for luminance of an environment of claim 11, wherein the gain controller adjusts the gain setting further according to a specific γ curve.

16. The display device capable of compensating for luminance of an environment of claim 15, wherein a curvature of the specific γ curve is 2.2.

17. The display device capable of compensating for luminance of an environment of claim 11, wherein the scaler further comprises:

a storage device, electrically connected to the scaler, for storing a look-up table, the look-up table storing a plurality of gain setting adjustment policies;

wherein the gain controller selects a gain setting adjustment policy from the look-up table according to the sensing signal in order to adjust the gain setting.

18. The display device capable of compensating for luminance of an environment of claim 11, further comprising:

a storage device, electrically connected to the scaler, for storing a look-up table, the look-up table storing a plurality of gain setting adjustment policies;

wherein the gain controller selects a gain setting adjustment policy from the look-up table according to the sensing signal in order to adjust the gain setting.

19. The display device capable of compensating for luminance of an environment of claim 11, wherein the adjusted image signal and the compensated image signal are both composed of RGB signals.

20. The display device capable of compensating for luminance of an environment of claim 11, wherein the sensor is a light-sensing IC, a light-sensing diode, or a light-sensing resistor.

* * * * *

UNITED STATES PATENT AND TRADEMARK OFFICE

CERTIFICATE OF CORRECTION

PATENT NO. : 7,633,558 B2
APPLICATION NO. : 11/278954
DATED : December 15, 2009
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this

Ninth Day of November, 2010

David J. Kappos

David J. Kappos
*Director of the United States Patent and Trademark Office*